US006233680B1

(12) United States Patent
Bossen et al.

(10) Patent No.: US 6,233,680 B1
(45) Date of Patent: May 15, 2001

(54) METHOD AND SYSTEM FOR BOOT-TIME DECONFIGURATION OF A PROCESSOR IN A SYMMETRICAL MULTI-PROCESSING SYSTEM

(75) Inventors: Douglas Craig Bossen; Alongkorn Kitamorn, both of Austin; Charles Andrew McLaughlin, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,952

(22) Filed: Oct. 2, 1998

(51) Int. Cl.[7] .................................................. G06F 15/177
(52) U.S. Cl. .................................................. 713/1; 714/47
(58) Field of Search .................................. 713/1, 2, 100; 714/2, 3, 7, 10, 12, 47, 48, 49

(56) References Cited

U.S. PATENT DOCUMENTS

| | | | |
|---|---|---|---|
| 4,924,466 | * | 5/1990 | Gregor et al. ........................ 371/12 |
| 5,444,859 | * | 8/1995 | Baker et al. ........................ 395/575 |
| 5,450,576 | * | 9/1995 | Kennedy .................................. 713/1 |
| 5,642,506 | * | 6/1997 | Lee ......................................... 713/1 |
| 5,790,850 | * | 8/1998 | Matu ....................................... 713/2 |
| 5,867,702 | * | 2/1999 | Lee ......................................... 713/1 |
| 5,889,961 | * | 3/1999 | Dobbek ................................ 709/247 |
| 5,978,938 | * | 11/1999 | Kaiser et al. .......................... 714/48 |
| 5,978,954 | * | 11/1999 | Ou et al. ............................. 714/769 |
| 6,014,756 | * | 1/2000 | Dottling et al. ........................ 714/15 |

\* cited by examiner

Primary Examiner—Wayne Amsbury
Assistant Examiner—Mary Wang
(74) Attorney, Agent, or Firm—Robert M. Carwell

(57) ABSTRACT

A method and system for deconfiguring a CPU in a processing system is disclosed. In one aspect, a processing system is disclosed that comprises a central processing unit (CPU), and a memory coupled to the CPU. The error status register for capturing information concerning the status of the CPU. The processing system includes a service processor for gathering and analyzing status information from the CPU error register. The processing system also includes a nonvolatile device coupled to the service processor. The nonvolatile device includes a deconfiguration area. The deconfiguration area stores information concerning the status of the CPU from the service processor. The deconfiguration area also provides information for deconfiguring a CPU during a boot time of the processing system. Accordingly, through the present invention, CPU errors are detected during normal computer operations by error detection logic. This detection is utilized during any subsequent boot process by service processor firmware to deallocate the defective CPU. This is accomplished through the use of error status registers within the CPU and through the use of a deconfiguration area in the nonvolatile device which provides information directly to the service processor.

2 Claims, 4 Drawing Sheets

CPU GENERAL RECORD FORMAT

| BYTE | DESCRIPTION |
|---|---|
| 0-1 | RL: Record Length per CPU deconfigurable unit |
| 2 | N: Maximum number of deconfigurable units in the system when fully configured |
| 3-7 | L2 size from CPU card VPD ZC-L2 field |
| 8-10 | CPU FRU version from CPU card VPD ZC-PF field. This information is also used for the xxx value of CPU 8-digit error code. |
| 11-20 | Processor speed from CPU card VPD ZC-PS field. |
| 21-30 | System bus speed from CPU card VPD ZC-SB field. |
| 31-31+ (N*RL) | Specific CPU record data. The remaining fields of the CPU record consists of N* RL-byte sub-records, one for each possible CPU (N is the value in bytes 2) |

FIG. 3

CPU SPECIFIC RECORD FORMAT

| BYTE | BIT | DESCRIPTION |
|---|---|---|
| 0 | | Physical CPU number, as defined in the OF device tree and error log entry (OpenPic Interrupt) |
| 1 | | Hardwired CPU id (PIR or EAR) |
| 2 | 0 MSB | Update status for byte 3:<br>0 = byte 3 in this record is consistent with CPU VPD ZC-ER field<br>1 = byte 3 in this record has been updated by either system or service processor firmware. |
| | 1-3 | Reserved |
| | 4-7 | Present & Current configuration status of this CPU:<br>0x0 Not Present<br>0x1 Present and configured by system.<br>0x2 Present, deconfigured by system (failure criteria met).<br>0x3 Present and manually configured (regardless of runtime failure criteria)<br>0x4 Present and manually deconfigured (regardless of runtime failure criteria) |
| 3 | | Fail Status (This field also used for the RR value in the CPU 8-digit error code)<br>0x00 No failure<br>0x1R BIST failure<br>0x2R POST failure<br>0x3n Run-time non-recoverable machine check error.<br>0x4n Run-time non-recoverable checkstop error.<br>0x5n Run-time recoverable error threshold exceeded (CPU internal errors).<br>0x6n Run-time recoverable error threshold exceeded (L2 single bit ECC)<br>Note: n = number of failures or thresholds exceeded<br>R = additional reason codes for BIST or POST failures |
| 4-13 | | 10-byte value containing the CPU VPD serial number (SN) |
| 14-(14+Y) | | y-byte value containing the CPU FRU physical/hardware location code (in ASCII form).<br>Note: The y value is platform dependent. For Sphinx, y = 5. |

FIG. 4

METHOD AND SYSTEM FOR BOOT-TIME DECONFIGURATION OF A PROCESSOR IN A SYMMETRICAL MULTI-PROCESSING SYSTEM

FIELD OF THE INVENTION

The present invention relates generally to processing systems and more particularly to deconfiguring a processor at the boot-time of a symmetrical multi-processing (SMP) system.

BACKGROUND OF THE INVENTION

Processing systems which include memories and processors oftentimes experience failures. Sometimes these failures are so-called hard errors, from which no recovery is possible. Thereafter the device that has caused the hard error is replaced. On the other hand, oftentimes failures are repeatable or so-called soft errors, which occur intermittently and randomly. Often these soft errors are repeatable and are localized to a particular processor within the processing system. These soft errors therefore cause multiple processing system failures.

However, it is frequently difficult to obtain and maintain information in existing conventional systems about the processor soft errors. Also, in conventional processing systems, a processor with intermittent errors is typically not deallocated from the system. Clearly, what is needed is a system for determining the cause of a repeatable or soft error and a system and method for deallocating the particular processor associated with the soft error. The system must be easy to implement and cost effective, and should be easily implemented in existing systems. The present invention addresses such a need.

SUMMARY OF THE INVENTION

A method and system for deconfiguring a processor in a SMP system is disclosed. In one aspect, a processing system is disclosed that comprises multiple central processing units (CPUs), and a memory coupled to the CPUs. Each CPU includes error status registers for capturing information concerning the status of its errors. The processing system includes a service processor for gathering and analyzing status information from each CPU. The processing system also includes a nonvolatile device coupled to the service processor. The nonvolatile device includes a deconfiguration area. The deconfiguration area stores information concerning the status of the CPUs from the service processor. The deconfiguration area also provides information for the service processor to deconfigure a CPU during the boot time of the processing system. The processing system also includes system logic to logically remove a CPU from the system.

Accordingly, through the present invention, CPU errors are detected during normal computer operations by error detection logic. This detection is utilized during any subsequent boot process by the service processor to deallocate the defective CPU. This is accomplished through the use of error status within each CPU and system logic, and through the use of a deconfiguration area in NVRAM, which provides information directly to the service processor.

BRIEF DESCRIPTION OF THE DRAWINGS

FIG. 3 is an example of the CPU General Record Format.

FIG. 4 is an example of the CPU Specific Record Format.

DETAILED DESCRIPTION OF THE INVENTION

The present invention relates to a method and system for deconfiguring a CPU at boot-time for a SMP system. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
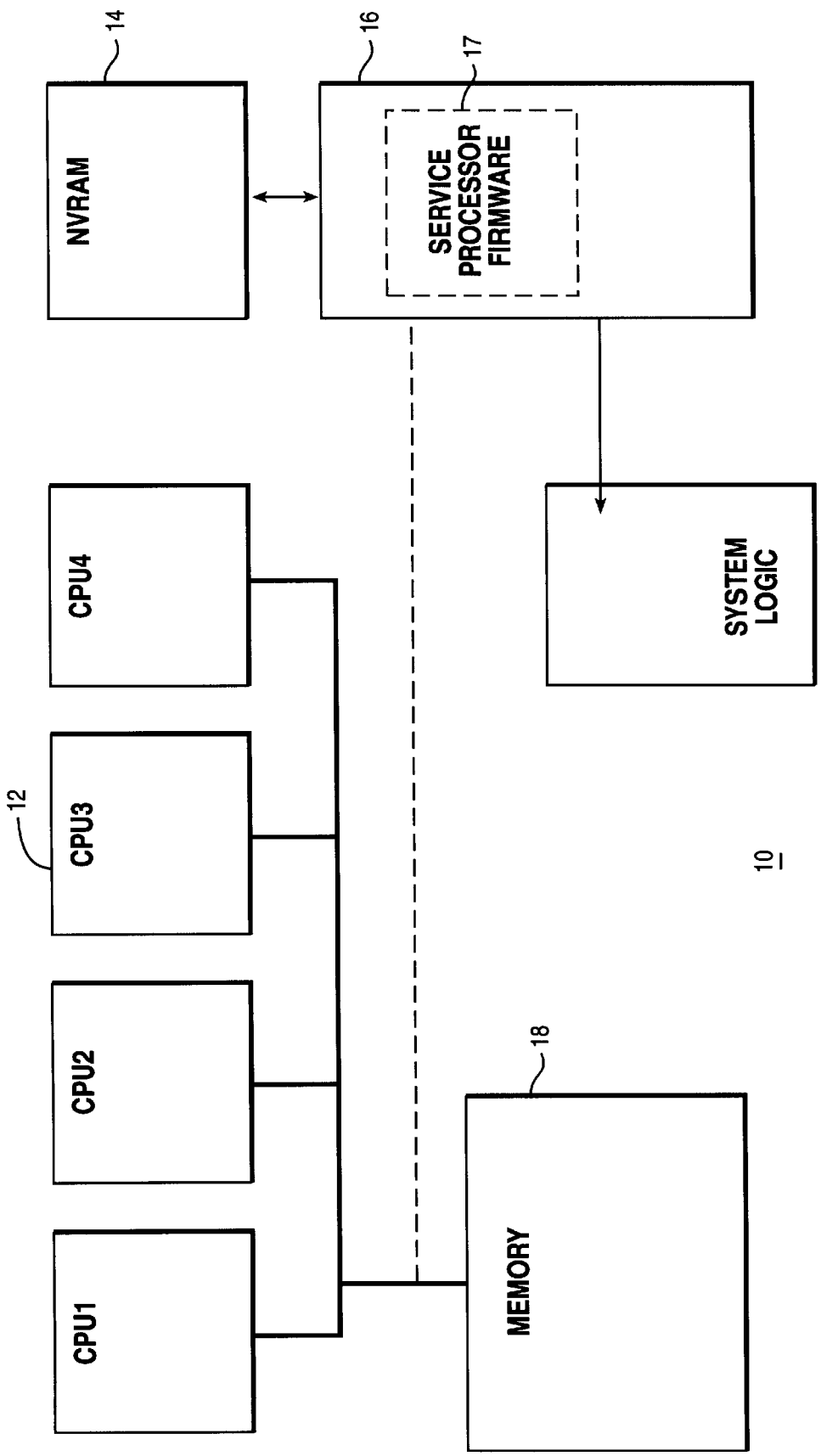
FIG. 1 is a block diagram of a conventional processing system

FIG. 1 is a block diagram of a conventional SMP computer processing system 10. As is seen, the conventional SMP computer processing system includes multiple CPUs 12, and memory 18. The CPUs 12 are in communication with a nonvolatile device such as a nonvolatile random access memory (NVRAM) 14 which contains pertinent system information. The service processor 16 includes service processor firmware 17 and is in communication with NVRAM 14 to provide information thereto. As has been before mentioned, when one of the CPUs in the system has soft errors that are affecting the operation of the processing system 10, the typical method for obtaining information about what is wrong with the CPU 12 is to stop system operation and then run diagnostic tests to pinpoint the source of error.

Accordingly, the service processor firmware 17 would initiate this diagnostic test when the system 10 is shut down. Heretofore, the typical manner of addressing the problem of repetitive soft errors was to shut down the processing system 10 and determine which CPU 12 is defective.

It is possible, however, that even if one CPU is shut down, the processing system 10 could still operate effectively. Accordingly, the present invention allows for the processing system to resume while deconfiguring the CPU that is causing the repeatable soft errors.

Accordingly, through the present invention, CPU errors are detected during normal computer operations by error detection logic. This detection is utilized during any subsequent boot process by service processor firmware to deallocate the defective CPU. This is accomplished through the use of error status within each CPU and system logic, and through the use of a deconfiguration area in the nonvolatile device, which provides information directly to the service processor. To further describe the present invention in more detail, refer now to FIG. 2.

Figure 2:
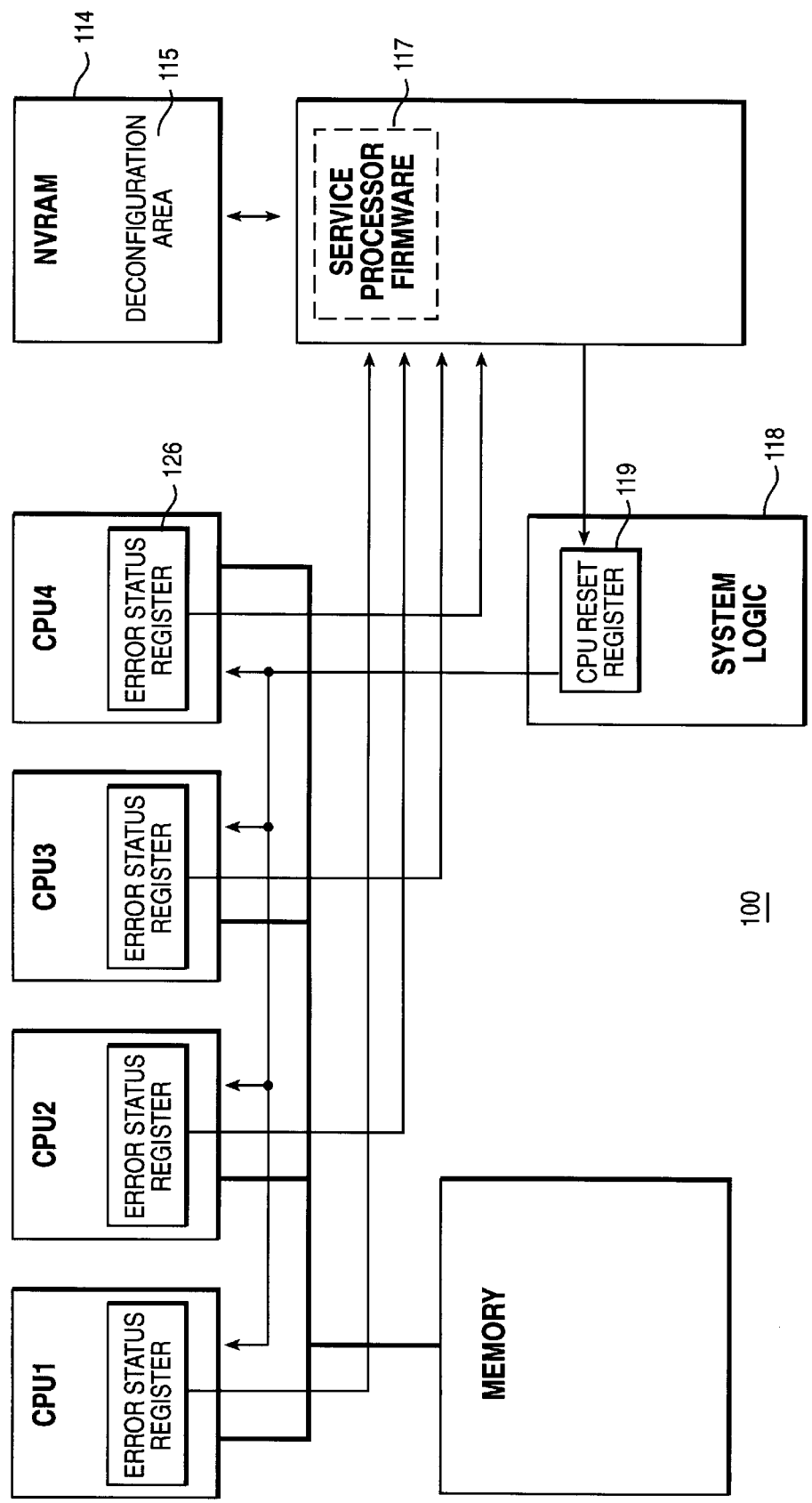
FIG. 2 is a block diagram of a processing system in accordance with the present invention.

FIG. 2 is a block diagram of a processing system 100 in accordance with the present invention. As is seen, some of the elements are similar to those shown in FIG. 1. However, the NVRAM 114 includes a deconfiguration area 115 which stores pertinent status information received from the service processor firmware 117. The service processor 117 will deconfigure a CPU based upon the information in the deconfiguration area 115. The CPU error status registers 126 provides information to the service processor firmware 117 which allows the firmware 117 to store the error status information in the deconfiguration area 115 of the NVRAM 114. The contents of the error status register 126 that provide the indication to the service processor firmware 117 of a recoverable error is in a preferred embodiment, a bit to indicate the presence of an unrecoverable internal error.

An important portion of the present invention is the deconfiguration area 115 of the NVRAM 114. The purpose of the deconfiguration area 115 is to store information concerning each CPU error status and configuration states. The deconfiguration area 115 should be flexible enough to allow modification to existing states and be able to handle the addition of new records. The deconfiguration area 115 and its initialization will be described in more detail hereinbelow.

The deconfiguration area 115 comprises the CPU General Record Format, and the CPU Specific Record Format.

FIG. 3 is an example of the CPU General Record Format. FIG. 4 is an example of the CPU Specific Record Format.

The deconfiguration area is initialized by the service processor firmware 117 as part of NVRAM 114 initialization process. The service processor firmware 117 initializes the deconfiguration area 115 as follows:
1. one CPU General Format Record
2. n CPU Specific Record Format, where n=maximum number of CPUs in the system when fully configured
3. a CPU deconfiguration area address pointer in the lower part of the mailbox-in buffer Each of the initialization values are described below.

Initialization Values

A. CPU General Record Format (FIG. 3)
1. Byte 0-1, RL=14+y, where y=maximum number of bytes to hold a CPU FRU location code
2. Byte 2, N=maximum number of CPUs in the system when fully configured
3. Byte 3-30, copy the ASCII value from CPU VPD ZC-L2, ZC-PF, ZC-PS and SC-SB field B. CPU Specific Record Format (FIG. 4)
1. Byte 0, physical CPU number (OpenPic Interrupt) for this CPU as defined in the Product Functional Spec.
2. Byte 1, CPU ID as defined in PIR or EAR register
3. Byte 2-bit 0=0
4. Byte 2-bit 1-3=0
5. Byte 2-bit 4-7=0, if the CPU is not present, and =1 if the CPU is present
6. Byte 3, the ASCII value from CPU VPD ZC-ER field converted to hex format
7. Byte 4-13, copy the ASCII value from CPU VPD SN field
8. Byte 14-(14+y), the physical/hardware location code for this CPU as defined in the Product Functional Spec Another important feature of the present invention is the interaction of the service processor firmware 115 after the system failure and during system power-on and boot phase.

After a system failure occurs, the service processor firmware reads all CPU error status registers to determine the failure cause. If a CPU internal error is determined, the service processor firmware updates the deconfiguration area 115 as follows:
1. If the current "Fail Status" for this CPU=No failure, change "Fail Status" (byte 3) to 0x41
2. If the current "Fail Status" for this CPU indicates previously reported error (0x3n, 0x4n) change the value n in "Fail Status" (byte 3) to n+1
3. If the current "Fail Status" for this CPU indicates previously reported recoverable error (0x5n or 0x6n), change "Fail Status" (byte 3) to 0x42
4. Change "Update Status" (byte 2, bit 0) to 0b1

During the system power-on and boot phase, the service processor firmware interacts with the deconfiguration area 115 as follows:
1. Verify that all FRU serial numbers from VPD are consistent with the deconfiguration area 115 information. If a change is detected (new FRU installation, FRU removal or FRU swap), the information is updated.
2. The configuration status for each CPU is updated based on prior run time fail status. This step is repeated for each memory to CPU that is present in the system as described below:
   a. "Present & Current Configuration status" in the CPU specific record format (FIG. 4) is read (byte 2, bit 4-7), if value=1, update required, go to step b below.
      if value=2 or 4 (deconfigured), no update required.
      if value=3, manually configured by user, no update required.
   b. "Fail Status" (byte 3) is read, if one of the following criteria is met, change "Present & Current configuration status" (byte 2, bit 4-7) to deconfigured (2),
      if value=0x3n or –x4n, where n=2 or greater.
      if value=0x5n or 0x6n, where n=1 or greater.

Once a CPU is deconfigured it remains off-line for subsequent reboots until the CPU is replaced or the user manually brings the CPU back on-line.

Accordingly, through the present invention, CPU errors are detected during normal computer operations by error detection logic. This detection is utilized during any subsequent boot process by the service processor and its firmware to deallocate the defective CPU. This is accomplished through the use of error status registers within each CPU and through the use of a deconfiguration area in the nonvolatile device. The service processor deallocates a CPU by setting a respective bit in the CPU reset register 119. The system logic 118 holds the CPU in reset state.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A processing system comprising:
   a central processing unit (CPU) including a CPU error status register for storing indications of CPU run time fail status;
   a next CPU and a corresponding next error status resister;
   a memory coupled to the CPU;
   a service processor including service processor firmware for gathering and analyzing status information from the CPU error status register; and
   a nonvolatile memory means coupled to the service processor and including a deconfiguration area means for storing information concerning the status of the CPU from the service processor and for providing information for deconfiguring the CPU during a boot time of the processing system;
   wherein a state of either the CPU error status register or the next CPU error status register provide the information to service processor firmware of the status of the CPU or the next CPU, respectively, in the system.

2. The processing system of claim 1 wherein the deconfiguration area comprises a CPU General Record Format and a CPU Specific Record Format.

* * * * *